US006249960B1

(12) United States Patent

Faesel

(10) Patent No.: US 6,249,960 B1
(45) Date of Patent: *Jun. 26, 2001

(54) TOOL FOR MANIPULATING AN ELECTRICAL CONNECTOR AND METHOD OF USE

(75) Inventor: Dennis W. Faesel, Lewisberry, PA (US)

(73) Assignee: Berg Technology, Inc., Reno, NV (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,807

(22) Filed: Dec. 31, 1996

(51) Int. Cl.[7] .......... B23P 19/00

(52) U.S. Cl. .......... 29/762; 29/750; 29/758; 29/764; 81/3.55; 439/152; 439/160; 439/480; 439/483

(58) Field of Search .......... 29/762, 764, 750, 29/758; 439/160, 152, 483, 480; 81/3.55

(56) References Cited

U.S. PATENT DOCUMENTS

| | | | | |
|---|---|---|---|---|
| 1,719,311 | | 7/1929 | Sargent . | |
| 2,470,309 | | 5/1949 | Hepp . | |
| 2,613,562 | * | 10/1952 | Clark | 81/6 |
| 2,687,567 | | 8/1954 | Walraven | 29/270 |
| 2,811,061 | | 10/1957 | Radovich | 81/336 |
| 3,071,849 | | 1/1963 | Krohm | 29/270 |
| 3,117,370 | * | 1/1964 | Kauppi et al. | 29/762 X |
| 3,406,412 | | 10/1968 | Kottas | 7/717 |
| 3,559,267 | | 2/1971 | Castellani et al. | 13/4 |
| 4,015,871 | | 4/1977 | Koerbel et al. | 294/19 R |
| 4,433,463 | | 2/1984 | DuVal | 29/239 |
| 4,479,406 | * | 10/1984 | Shoemaker | 81/3.55 |
| 4,649,613 | * | 3/1987 | Bednarik | 29/253 |
| 4,730,386 | | 3/1988 | Fieberg et al. | 29/758 |
| 4,787,139 | | 11/1988 | Sweet | 29/758 |
| 4,817,274 | * | 4/1989 | Higgins | 29/764 |
| 4,852,925 | | 8/1989 | Lodin | 294/2 |
| 4,858,309 | | 8/1989 | Korsunsky et al. | 29/764 |
| 4,961,256 | | 10/1990 | Faillace | 29/764 |
| 4,973,255 | * | 11/1990 | Rudoy | 439/160 X |
| 5,203,074 | | 4/1993 | Lam | 29/829 |
| 5,232,375 | * | 8/1993 | Todd | 439/160 X |
| 5,365,809 | | 11/1994 | Hsiao et al. | 81/176.3 |
| 5,440,803 | | 8/1995 | Selgas et al. | 29/764 |
| 5,473,816 | * | 12/1995 | Harden, Jr. et al. | 29/764 X |

* cited by examiner

*Primary Examiner*—Lee Young
*Assistant Examiner*—Rick Kiltae Chang
(74) *Attorney, Agent, or Firm*—Perman & Green, LLP

(57) ABSTRACT

Disclosed is a tool for use in disengaging elements of an electrical connector comprising an elongated axial handle having a griping end and a forward distal end; first and second opposed arms extending laterally from the elongated axial handle adjacent said forward distal end; and laterally spaced first and second fingers ending forward respectively from said first and second opposed arms to be engageable with the electrical connector. A combination of this tool and an electrical connector and a method of using this tool are also disclosed.

13 Claims, 4 Drawing Sheets

TOOL FOR MANIPULATING AN ELECTRICAL CONNECTOR AND METHOD OF USE

BACKGROUND OF THE INVENTION

1. Field of the Invention

The present invention relates to electrical connectors and more particularly to tools for manipulating electrical connectors.

2. Brief Description of Prior Developments

Various applications may present situations in which the disengagement of electrical headers and receptacles may be difficult. For example, it has been suggested that PCMCIA headers may be connected to a printed circuit board (PCB) by means of a flex cable having a terminal header which mates with a receptacle mounted on the PCB. The advantage to such an arrangement is that the PCMCIA assembly may be placed in a system essentially without regard to PCB location. At some locations on the PCB, however, the connector may be awkwardly positioned for the purpose of disengaging the header from the receptacle. Consequently, in such cases the disengagement of the header and receptacle may be accomplished only with difficulty. Furthermore, when attempts are made to disengage a combination receptacle and flex cable from a board mounted receptacle, it is found that the flex cable may be inadvertently torn or removed from the header.

A need, therefore, exists for means of quickly, easily and efficiently unmating an unshrouded header from a receptacle mounted on a PCB. A need also exists for a means for unmating a header which is attached to a flex cable from a receptacle so that neither the connector itself or the flex cable is likely to be damaged during the unmating procedure.

SUMMARY OF THE INVENTION

The present invention includes a tool for use in disengaging elements of an electrical connector. This tool includes an elongated axial handle having a griping end and a forward distal end. First and second opposed arms extend laterally from the elongated axial handle adjacent the forward distal end of the handle. Laterally spaced first and second fingers extend forward respectively from said first and second opposed arms to be engageable with the electrical connector.

The present invention also includes a combination of an electrical connector and a hand tool. The electrical connector includes an elongated receptacle having an insulative base with first and second ends and an insulative peripheral wall recessed from said first and second ends projecting from said insulative base to form a central opening. The connector also includes an elongated shroudless header having an insulative base with first and second ends. An insulative projection is spaced from said first and second ends and depends from the insulative base to engage the central opening of the receptacle. The first and second ends are therefore superimposed, respectively, over the first and second ends of the receptacle so as to form, respectively, first and second lateral recesses between said first and second ends of the insulative bases of the receptacle and the header. The tool described above is positioned relative to this connector so that the first and second fingers engage, respectively, the first and second lateral recesses of the connector.

Also encompassed within the invention is a method of disengaging a header from a receptacle in which, in the combination described above, the tool is pivoted on the longitudinal axis of its elongated handle. One of the fingers bears against the receptacle and easily lifts it from the header. Preferably, the finger will bear against a metallic hold down adjacent one of the ends of the header so that the danger of damaging the connector by using the tool on the insulation is avoided.

BRIEF DESCRIPTION OF THE DRAWINGS

The tool, combination and method of use of the present invention are further described with reference to the accompanying drawings in which.

DETAILED DESCRIPTION OF THE PREFERRED EMBODIMENTS

Figure 4:
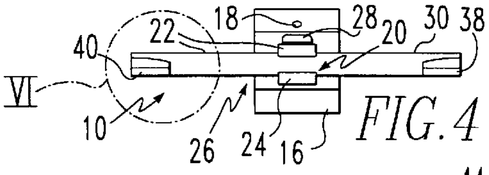
FIG. 4 is a front end view of the tool shown in FIG. 1.
Figure 3:
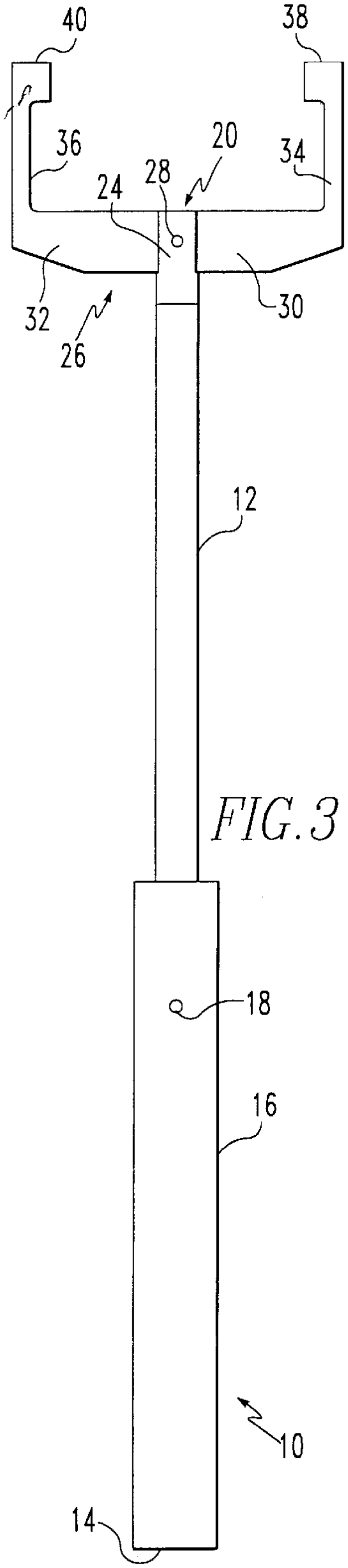
FIG. 3 is a bottom plan view of the tool shown in FIG. 1.
Figure 2:
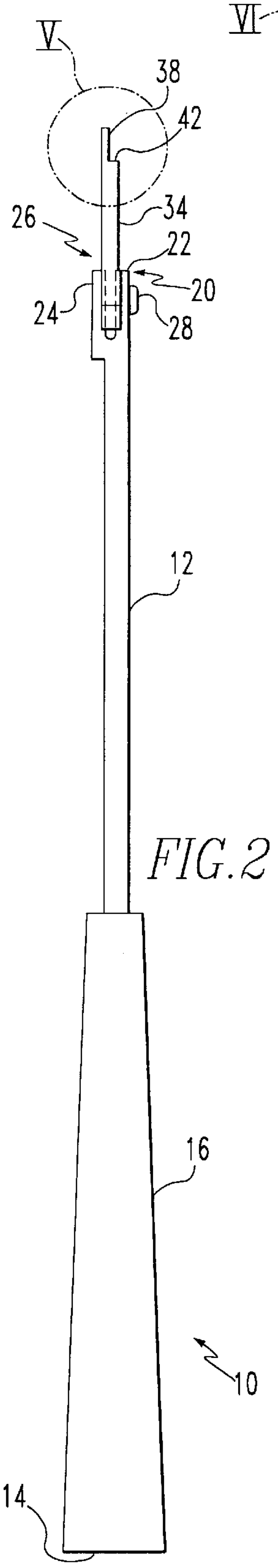
FIG. 2 is a side elevational view of the tool shown in FIG. 1.
Figure 1:
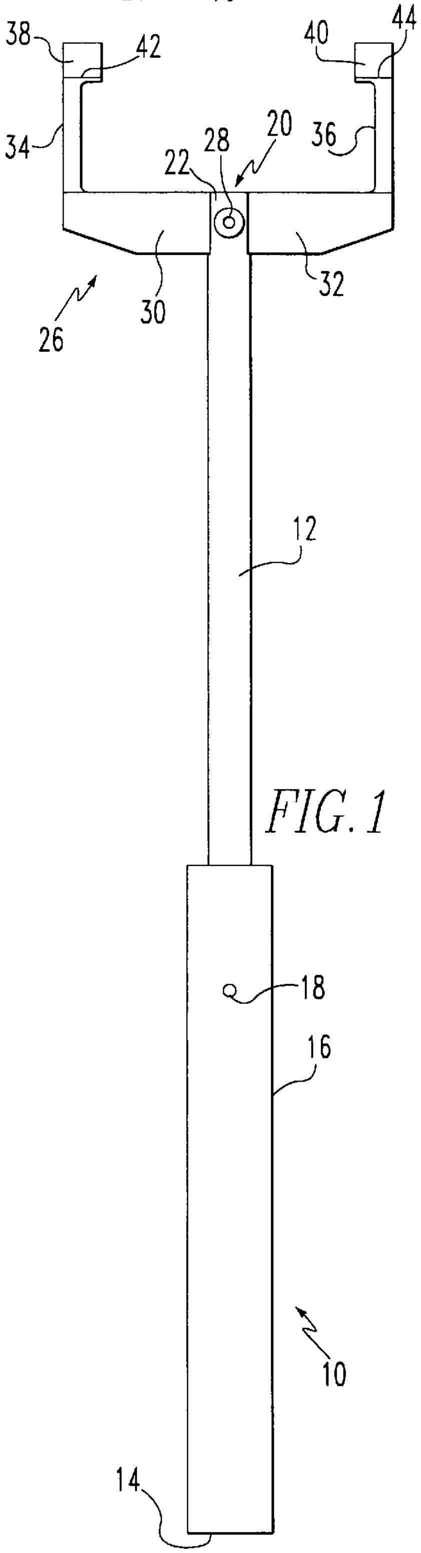
FIG. 1 is a top plan view of a preferred embodiment the tool of the present invention.
Figure 5:
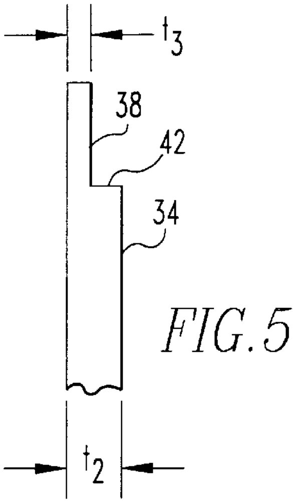
FIG. 5 is a detailed view of the area which Circle V in FIG. 2.
Figure 6:
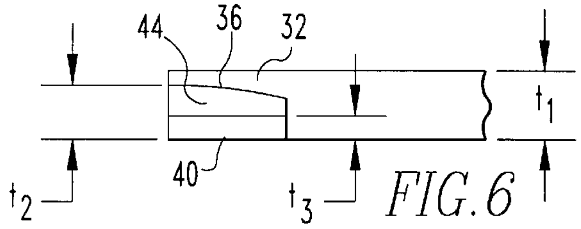
FIG. 6 is a detailed view of the area within Circle VI in FIG. 4.

Referring to FIGS. 1–6, the tool is shown generally at numeral 10. This tool has an elongated axial handle 12 which has a griping end 14 on which a plastic hand grip 16 is attached by means of a pin 18. The handle also has a forward distal end 20 at which there is an upper terminal fork 22 and a spaced lower terminal fork 24 where a U-shaped structure shown generally at numeral 26 is attached to the handle by means of a screw 28. This U-shaped structure 26 includes opposed lateral arms 30 and 32 which extend away from the handle adjacent the distal end 20. The U-shaped structure 26 also includes spaced fingers 34 and 36 which extend perpendicularly respectively from lateral arms 30 and 32. At the terminal ends of these fingers 34 and 36 are, respectively, tips 38 and 40. Between the tip 38 and the finger 34 there is a vertical step 42. Similarly, between the tip 40 and the finger 36 there is a vertical step 44. It will also be observed that the thickness of the lateral arm $t_1$ is greater than the thickness of the finger $t_2$ and the thickness of the finger is greater than the thickness of the tips $t_3$. It will be appreciated that the U-shaped structure 26 may be removed from the handle 12 so that a differently sized U-shaped structure may be substituted so that the tool may be used with differently sized connectors.

Figure 9:
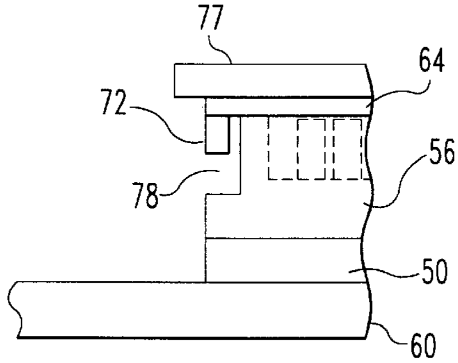
FIG. 9 is a detailed view of the area within Circle IX in FIG. 8*a;*
Figure 10:
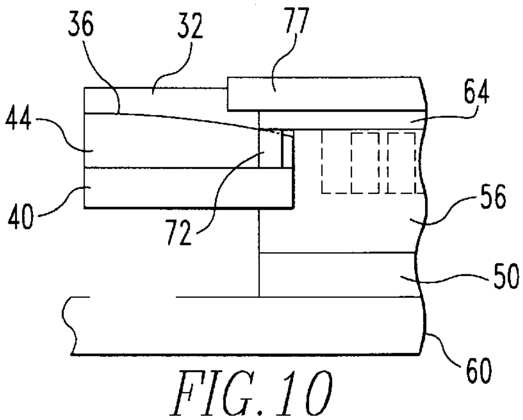
FIG. 10 is a detailed view of the area within Circle X in FIG. 8*b*.
Figure 7:
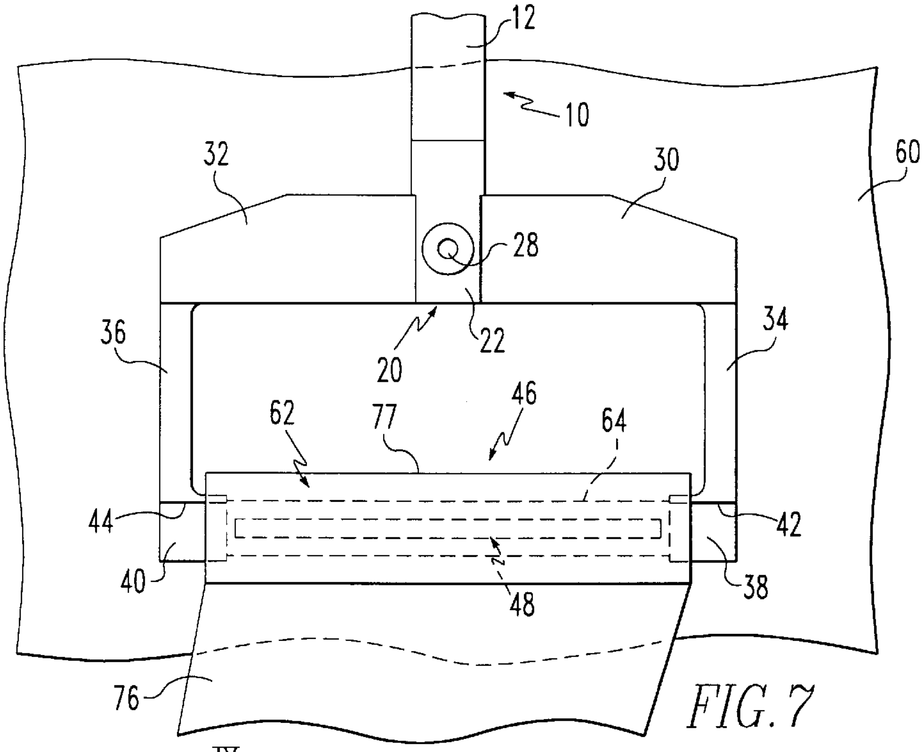
FIG. 7 is a fragmented top plan view of the tool shown in FIG. 1 engaged with a connector.
Figure 8A:
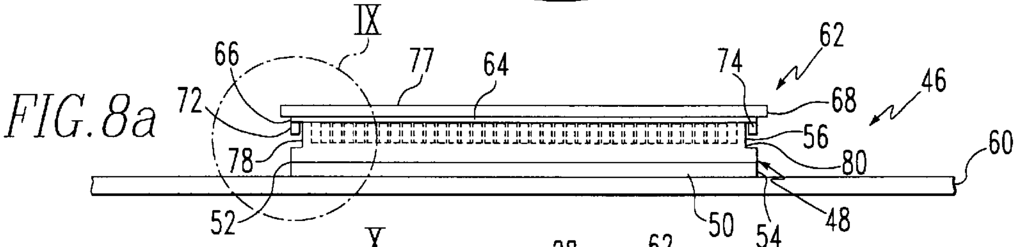
FIG. 8*a* is a side elevational view of a connector with which the tool of the present invention may be used.
Figure 8B:
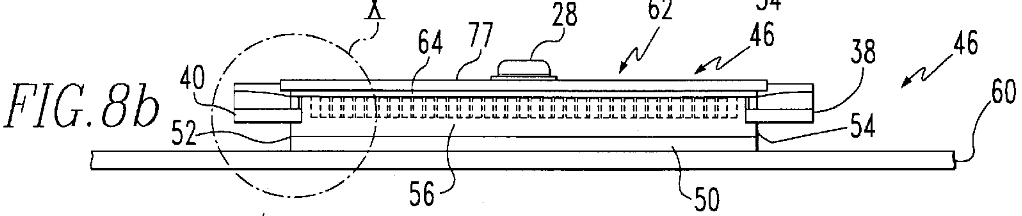
FIG. 8*b* is a side elevational view of the connector shown in FIG. 8*a* which is engaged by the terminal finger elements of the tool shown in FIG. 1.
Figure 8C:
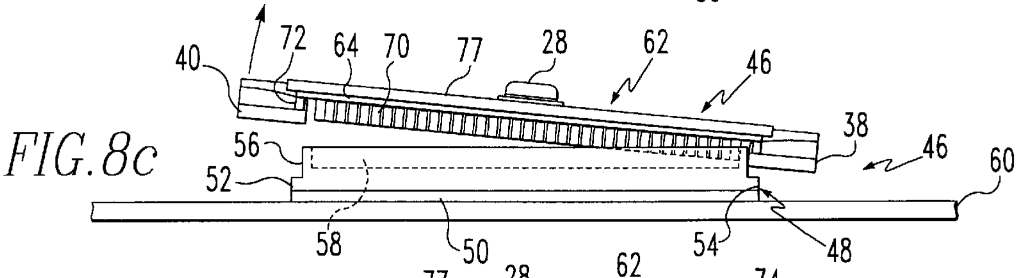
FIG. 8*c* is a view similar to FIG. 8*d* showing a further step in the disengagement of the elements of the connector with the tool shown in FIG. 1.
Figure 8D:
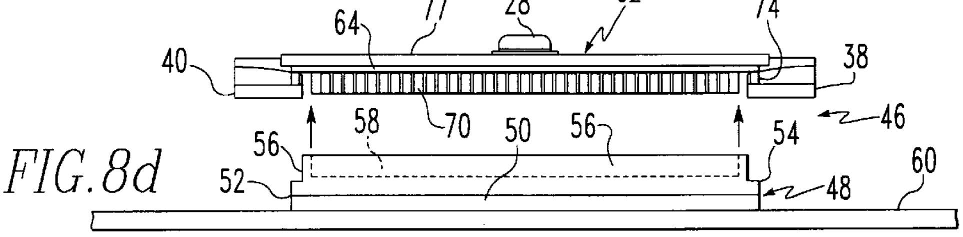
FIG. 8*d* shows still a further step of the disengagement of the elements of the connector shown in FIG. 8*c;*

Referring to FIGS. 7–9, a connector with which this tool may be used is shown generally at numeral 46. This connector includes a receptacle shown generally at numeral 48 which includes an insulative base 50 having opposed ends 52 and 54. A peripheral wall 56 projects upwardly from the base and, as is conventional, forms an elongated opening 58 exposing conductive contacts (not shown). This receptacle is mounted on a PCB 60, also by conventional means. A header shown generally at 62 includes an insulative base 64 having opposed ends 66 and 68. An elongated projection is inwardly spaced from the opposed ends of the insulative base. As is conventional, this projection supports conductive contacts which connect to the contacts in the receptacle. Between the elongated projection and the opposed ends of the insulative base there are metallic hold downs 72 and 74. As is conventional, a flex cable 76 (FIG. 7) is soldered to conductive pads (not shown) on the base 64 of the header 62 and a backer board 77 is attached to the upper side of the flex cable by adhesive. Since the peripheral wall 56 of the receptacle 48 and the elongated projection 70 of the header 62 are spaced from the opposed ends of their respective insulative bases, lateral recesses 78 and 80 (FIG. 8*a*) are formed between the insulative base 50 of the receptacle and insulative base 64 of the header. Referring particularly to FIGS. 8*a*–8*d*, it will be seen that the tips 38 and 40 are, respectively, positioned in these recesses 80 and 78 so that when the tool is pivoted on the longitudinal axis of the handle tip 40 pushes against the receptacle to "banana peel" the receptacle from the header. Referring particularly to FIG. 8*d*, after such initial disengagement, the tip 38 also presses against the receptacle to assist in lifting the entire receptacle from the header. It will, in particular, be observed from FIG. 10 that the tip 40 bears against the metallic hold down 72 so as to avoid damaging the insulative base of the header. Similarly tip 38 bears against the metallic hold down 74. Referring particularly to FIG. 7, it will also be appreciated that the steps 42 and 44, respectively, between fingers 34 and 36 and tips 38 and 40 come to rest on the insulative base 64 of the header 62 so as to prevent over insertion of the tool. It will also be understood that the backer board 77 will partially overlap tips 38 and 40. Those skilled in the art will appreciate that the connector shown is a CONAN electrical connector which is commercially available from Berg Electronics Group, Inc. located at St. Louis, Mo. It will, however, be understood that the tool of this invention may readily be adapted for use with many other types of commercially available electrical connectors.

Figure 11:
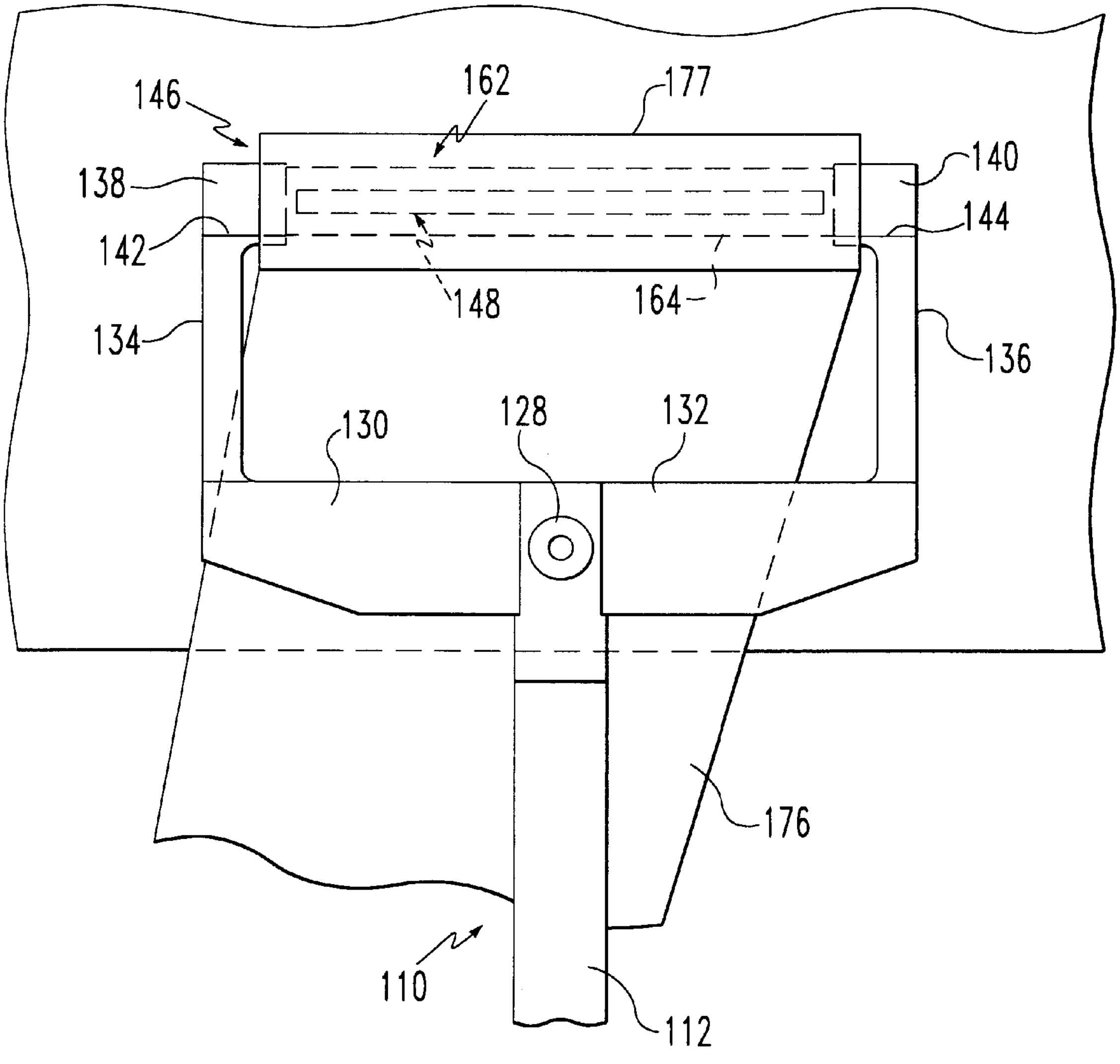
FIG. 11 is a fragmented top plan view of a tool essentially similar to the tool shown in FIG. 1 showing an alternate means of engaging a connector.

Referring to FIG. 11, it will be seen that the tool 110 having handle 12 attached by screw 128 may also be used to engage a connector 146 from the direction of the flexible ribbon cable. Here the connector 146 is comprised of a header 162 which is superimposed over a receptacle 148 that is mounted on a PCB 160, and as was described above, the header 162 is connected to a flex cable 176. In this embodiment the lateral arms 130 and 132 and the fingers 134 and 136 of the tool overlap the flex cable 176 to allow the connector to be engaged by the tips 138 and 140 when approached from such an angle may be more convenient. It will be appreciated that in this embodiment the steps 142 and 144 will also come to rest against the insulative base 164 of the header 162 so as to prevent over insertion of the tool. It will also be understood that the backer board 177 will partially overlap tips 138 and 140.

It will be appreciated that a simple, easy and an inexpensive means of disengaging a header from a receptacle without damaging adjacent flex cables has been described. It will also be appreciated that an additional advantage of this tool is that damage to the insulative sections of the connector may be avoided by engagement of the metallic hold downs with this tool.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In combination, an electrical connector and a tool for manipulation of an element of an electrical connector comprising:

(a) the electrical connector comprised of:

(i) an elongated receptacle having an insulative base with first and second ends and an insulative peripheral wall recessed from said first and second ends and projecting from said insulative base to form a central opening; and (ii) an elongated shroudless header having an insulative base with first and second ends and an insulative projection having first and second ends spaced respectively from said first and second ends of said insulative base, and said insulative projection depending from said insulative base of said elongated shroudless header to engage said central opening of said receptacle such that the first and second ends of the insulative base of the header are superimposed respectively over the first and second ends of the insulative base of the receptacle so as to form respectively first and second lateral recesses between said first and second ends of the insulative bases of the receptacle and the header, and first and second metallic hold downs are positioned on the insulative base of the header respectively between said first and second ends of the insulative base of the header and receptacle; and (b) the tool having a longitudinal axis comprised of:

(i) an elongated axial handle disposed in transverse relation to said electrical connector and having a griping end and a forward distal end;

(ii) first and second opposed arms extending laterally from the elongated axial handle adjacent said forward distal end; and (iii) laterally spaced first and second fingers extending respectively from said first and second opposite arms to be engaged with the electrical connector respectively in said first and second lateral recesses, wherein the first and second fingers respectively comprise first and second tips, and said first and second tips both extend forwardly and laterally inwardly, relative to said longitudinal axis of said tool and in opposed relation to each other, respectively from the first and second fingers, and said first and second fingers each have upper convex surfaces which curve inwardly and downwardly toward the longitudinal axis of the tool to facilitate pivoting of the tool against the header so as to disengage the header from the receptacle, and wherein the tool is positioned relative to the electric connector such that the first and second tips are positioned respectively in the first and second lateral recesses between the first and second ends of the insulative bases of the receptacle and the header, such that the first and second tips underlie respectively the first and second metal inserts on the elongated header, wherein when the tool is rotated about its longitudinal axis the first end of the projection of the header is initially disengaged by the first tip of the tool which bears against the first metallic hold down, after which the first and second tips bear respectively against the first and second metallic hold downs to lift the first and second ends of the projection of the header and fully disengage the header from the receptacle.

2. The combination of claim 1 wherein the header is connected to a flexible ribbon cable.

3. The combination of claim 2 wherein the flexible ribbon cable extends from the header in a first direction and the tool extends from the header in a second direction substantially opposite to said first direction.

4. The combination of claim 2 wherein the flexible ribbon cable extends from the header in a first direction and the tool extends from the header in a second direction which is substantially same as the first direction and the tool is at least partially superimposed over the ribbon cable.

5. The combination of claim 1 wherein the first and second fingers each have a finger thickness and the first and second tips each have a tip thickness and said finger thickness is greater than said tip thickness.

6. The combination of claim 1 wherein the tool further comprising first and second steps respectively between the first and second tips and the first and second fingers.

7. A method of manipulating an electrical connector comprising the steps of:

(a) first forming a combination of:

(i) the electrical connector comprised of:

(A) an elongated receptacle mounted on a printed circuit board (PCB) having an insulative base with first and second ends and an insulated peripheral wall recessed from said first and second ends and said insulated peripheral wall projects from said insulative base to form a central opening; and (B) an elongated shroudless header having an insulative base with first and second ends and an insulative projection having first and second ends spaced respectively from said first and second ends of said insulative base, and said insulative projection depending from said insulative base of said elongated shroudless header to engage said central opening in the receptacle such that the first and second ends of the insulative base of the header are superimposed respectively over the first and second ends of the insulative base of the receptacle so as to form respectively first and second lateral recesses between said first and second ends of the insulative bases of the receptacle and the header, and first and second metallic hold downs are positioned on the insulative base of the header respectively between said first and second end of the insulative base of the header and receptacle;

(ii) the tool having a longitudinal axis comprised of:

(A) an elongated handle having a longitudinal axis and disposed in transverse relation to said electrical connector and having a griping end and a forward distal end;

(B) first and second opposed arms extending laterally from the elongated axial handle adjacent said forward distal end; and (C) laterally spaced first and second fingers extending respectively in said first and second lateral recesses, wherein the first and second connection engagement means are respectfully first and second tips, and said first and second tips both extend forwardly and laterally inwardly, relative to said longitudinal axis of said tool and in opposed relation to each other, respectively from the first and second fingers, and first and second transverse abutment means are interposed respectively between the first and second fingers and the first and second tips, and said first and second fingers each have upper convex surfaces which curve inwardly and downwardly toward the longitudinal axis of the tool to facilitate pivoting of the tool against the header so as to disengage the header from the receptacle, and wherein the tool is positioned relative to the electrical connector such that the first and second tips are positioned respectively in the first and second lateral recesses between the first and second ends of the insulative bases of the receptacle and the header, such that the first and second tips underlie respectively the first and second metal inserts on the elongated header; and (b) then rotating the handle of the tool about its longitudinal axis, wherein the first end of the projection of the header is initially disengaged from the receptacle by the first tip of the tool which bears against the first metallic hold down when the handle of the tool is pivoted, after which the first and second tips bear respectively against the first and second metallic hold downs to lift the first and second ends of the header and fully disengage the projection of the header from the receptacle.

8. The method of claim 7 wherein the first and second metallic hold down means are positioned on the receptacle respectively between said first and second ends of the insulative base and the insulative projection and said finger which lifts the header away from the receptacle bears against one of said metallic hold down means.

9. The method of claim 7 wherein the header is connected to a flexible ribbon cable.

10. The method of claim 9 wherein the flexible ribbon cable extends from the header in a first direction and the tool extends from the header in a second direction substantially opposite from said first direction.

11. The method of claim 9, wherein the flexible ribbon cable extends from the header in a first direction and the tool extends from the header in a second direction substantially opposite to said first direction, and the tool is at least partially superimposed over the ribbon cable.

12. The method of claim 7 wherein the first and second fingers each have a finger thickness and the first and second tips each have a tip thickness and said finger thickness is greater than said tip thickness.

13. The method of claim 7 wherein the tool further comprising first and second steps respectively between the first and second tips and the first and second fingers.

* * * * *